July 11, 1961
C. H. BASSETT
2,992,179
FUEL ELEMENT FOR NUCLEAR REACTORS
Filed March 17, 1959
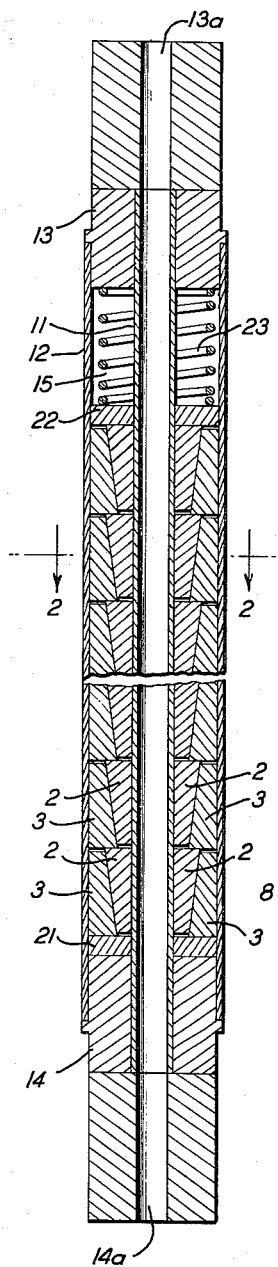
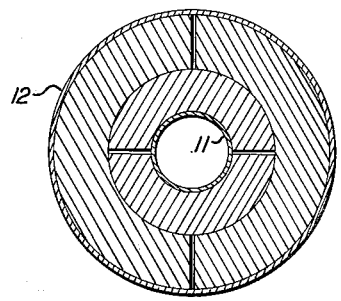
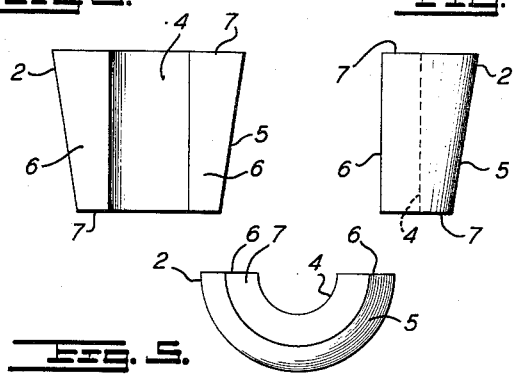
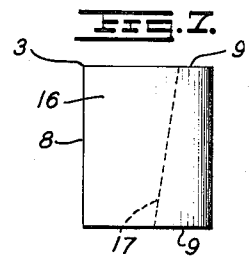
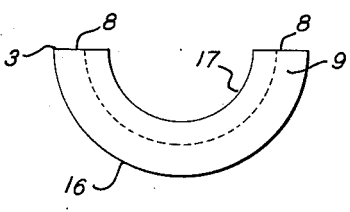
INVENTOR.
CHARLES H. BASSETT
BY
*A. Fredrick Hamann*
ATTORNEY United States Patent Office 2,992,179
Patented July 11, 1961

2,992,179
FUEL ELEMENT FOR NUCLEAR REACTORS
Charles H. Bassett, Riverdale, Md., assignor, by mesne assignments, to the United States of America as represented by the United States Atomic Energy Commission
Filed Mar. 17, 1959, Ser. No. 799,997
3 Claims. (Cl. 204—193.2)

This invention relates to fuel elements for nuclear reactors and, more particularly, to a fuel element particularly adapted for use in reactors of high power density used to generate steam for the production of electricity.

The present trend of thermal-reactor research is toward ceramic compounds, since an apparent limit on reactor operating temperatures and fuel burnup is imposed by swelling of metallic fuels at operating temperatures above 400° C. This swelling of metallic fuel is due in part to fission-product gases. When four atoms of U-235 are fissioned, one of the eight fission-product atoms formed is either xenon or krypton which are practically insoluble in uranium and are under very high pressure within the solid fuel lattice structure. As the maximum achievable burnup of metallic fuel is inversely related to the temperature of the fuel during irradiation, the theory is that metallic uranium becomes weaker at high temperatures, thereby permitting the expansion of internal fission-product gases to increase the size of the fuel elements by swelling to unacceptable limits.

One of the methods for overcoming the swelling problem is to use high density ceramic materials, such as uranium dioxide ($UO_2$) enriched with U-235, in the form of sintered cylindrical pellets which have a high melting point (2760° C.), good mechanical strength, good resistance to radiation damage, and high burnups. Burnups greater than 25,000 mwd./ton appear feasible without appreciable damage to the $UO_2$ and the structural confining material. The release of fission-product gases xenon and krypton from the irradiated $UO_2$ is diffusion controlled and hence high density $UO_2$ without interconnecting pores releases only very small amounts of the gases.

To prevent the escape of fission-product gases, sintered cylindrical ceramic fuel pellets have heretofore been housed within a metallic tube of compatible material, such as austenitic stainless steel or zirconium. Due to the relatively low neutron absorption of zirconium, it is preferred as a tubing material to effect savings through the use of uranium of lower enrichment, and through the reduction in the critical mass of uranium.

The thermal coefficient of expansion of stainless steel is greater than that of $UO_2$, whereas zirconium expansion is less than $UO_2$. This factor is of importance in fuel element design. Where a gap exists between the fuel and the tubing, the fuel pellet must operate at high temperatures in order to transfer heat across the gap. Heretofore, it has been the practice to grind cylindrical fuel pellets to close tolerances for snug engagement within close tolerance tubing, and such precision fabrication is very costly. To avoid finishing cylindrical pellets and tubing to exact size, fuel pellets have been thermally bonded to the tubing by a lead filler, as disclosed in Patent 2,838,-452, issued June 10, 1958, to John M. West. Such a lead filler results in an increase in the loss of neutrons by parasitic capture, has a low coefficient of heat conductivity and is fluid at relatively low operating temperatures.

An object of the invention resides in the provision of a nuclear reactor fuel element comprising concentric inner and outer tubes connected at their ends to nozzles to define therewith an annular chamber to receive a stack of fissionable fuel pellets formed to snugly engage the inner surfaces of the tubes to eliminate any gap therebetween.

Another object of the invention is to provide a fuel element comprising inner and outer groups or stacks of fissionable fuel pellets in the form of split bushings formed with wedge surfaces whereby the groups of pellets are urged against their respective tubes responsive to relative axial movement of the groups.

A further object of the invention is to provide a fuel pellet adapted to be formed of high density sintered uranium dioxide ($UO_2$) suitably enriched with uranium U-235.

Another object is to provide identical inner fuel pellets and identical outer fuel pellets adapted to be formed of $UO_2$ compressed to high densities and sintered for use in fuel elements without any machining operations.

The invention embodies other novel features, details of construction and arrangement of parts which are hereinafter set forth in the specification and claims and illustrated in the accompanying drawings forming part thereof, wherein:

FIG. 1 is a longitudinal section illustrating a fuel element embodying features of the invention.

FIG. 2 is an enlarged transverse section taken along the line 2—2 of FIG. 1.

FIGS. 3, 4 and 5 are detail elevations showing an inner fuel pellet segment.

FIGS. 6, 7 and 8 are detail elevations showing an outer fuel pellet segment.

Referring now to the drawings for a better understanding of the invention, the fuel element 10 is shown as comprising inner and outer concentric tubes 11 and 12, respectively, of stainless steel, or zirconium, having plugs 13 and 14 of stainless steel, or other suitable material, secured to opposite ends thereof to form a leakproof housing having an annular chamber 15 to enclose inner axially seriated annular assemblies of fuel pellet segments 2 and outer axially seriated annular assemblies of fuel pellet segments 3, the pellet segments preferably being formed of high density sintered uranium dioxide ($UO_2$) enriched with uranium–235. The plugs 13 and 14 are formed with axial passages 13a and 14a which serve as inlet and outlet nozzles for the flow of fluid through the inner tube 11.

The inner and outer annular asemblies of fuel pellet segments 2 and 3 are preferably arranged in pairs within the fuel element, as illustrated in FIG. 1. Each inner annular assembly of fuel pellet segments 2 comprise segments preferably identical in size and shape. As illustrated in FIGS. 3, 4 and 5, each segment is formed with an inner cylindrical surface 4 in radially spaced relationship to the inner tube 11 and a tapered outer surface 5, which surfaces merge with radial faces 6—6 and end surfaces 7—7. The semicylindrical surface 4 is formed with a radius corresponding to the radius of the outer surface of the inner tube 11 to eliminate any gap between the inner assembly of pellet segments and the inner tube.

Each outer annular assembly of fuel pellet segments 3 comprise segments preferably identical in size and shape. As illustrated in FIGS 6, 7 and 8, each segment 3 is formed with a cylindrical outer surface 16 in radially spaced relationship to inner tube 11 and a flared inner surface 17 to match and engage tapered surface 5 of its inner pellet assembly, which surfaces merge with radial surfaces 8—8 and end surfaces 9—9. The outer surface 16 has a radius equal to the inner radius of the outer tube 12 to eliminate any gap between the outer pellet segments 3 and the outer tube. The interface surfaces 5 and 17 have complementary tapers and are preferably substantially equal in size and shape for complementary wedge engagement when the end surfaces 7—7 on the inner pellet segments 2 are offset axially from the end surfaces 9—9 of the outer pellet segments 3, as illustrated in Fig. 2, for a distance of, for example, 0.005 to 0.020 inch to insure wedge engagement of the pellet segments against their respective tubes 11 and 12.

During assembly of the fuel element, the plug 14 is first secured to the ends of the tubes 11 and 12. A heat insulating washer 21 is then inserted between the tubes and against the plug 14. A pair of outer fuel pellet segments 3—3 are then inserted to engage the wafer 21, and a pair of inner fuel pellet segments 2—2 are inserted between the outer pellet segments and the inner tube 11. A second pair of outer fuel pellet segments 3—3 are then inserted to engage the adjacent ends of the first pair of inner pellet segments 2—2, and a second pair of inner pellet segments 2—2 are then inserted between the second pair of outer pellet segments and the inner tube 11.

After a predetermined number of fuel pellet segments 2 and 3 have been thus inserted between the inner and outer tubes, a second heat insulation wafer 22 is inserted to engage the end surfaces 7—7 of the adjacent inner pair of pellet segments 2—2. A stainless steel compression spring 23 is then inserted against the wafer 22, and the plug 13 is secured to the ends of the tubes 11 and 12 to compress the spring.

A fuel element of the type shown and described embodies certain important advantages over conventional rod type fuel elements, in that it provides a greater external surface area for the transfer of heat, the fuel pellet segments are of a form adapted to be compressed to higher densities than cylindrical pellets, and the inner tube permits a transfer of heat from the center of the fuel element. The fuel element is also adapted to replace three or more conventional fuel rods in a reactor core, thereby materially reducing fabrication and reprocessing costs. The fuel element may also embody a burnable poison to control the reactivity of the reactor; whereas, in the use of conventional rod type fuel elements, it has heretofore been necessary to provide a burnable poison externally of the fuel elements. It is also contemplated that the burnable poison material may be alloyed with a metal, such as beryllium or aluminum, to form a tube having a higher coefficient of heat conductivity than stainless steel.

By forming the fuel pellet segments 2 and 3 of high density, fissionable ceramic materials, such as uranium oxide ($UO_2$) suitably enriched with uranium-235, they have good mechanical strength, good resistance to radiation damage, and a high melting point of approximately 2760° C. As fuel pellet segments of this type may be formed without a high percentage of interconnecting pores, only small amounts of fission-product gases, xenon and krypton, are released during irradiation. The tubes 11 and 12 are preferably formed of zirconium due to its low neutron absorption properties and the resulting saving through the use of uranium of lower enrichment and the reduction in the critical mass of the uranium.

For control of excess reactivity, a tube of stainless steel or other metal embodying a burnable poison, such as boron, may be provided within the fuel element to enclose the inner tube 11.

During assembly of the fuel element the central opening and radial passages defined by the fuel pellet segments may be filled with a suitable heat conducting gas, such as helium.

The fuel rod, thus shown and described, is adapted for use in a fuel element assembly for a nuclear power reactor, as shown and described in a copending application of James J. Dickson, filed August 26, 1958, Ser. No. 757,381, the disclosure of which is incorporated herein by reference. See also, Nucleonics, vol. 15, No. 7, July 1957, page 94, for Uranium Dioxide Properties and Characteristics.

Standard assembling procedures are employed during assembly of the fuel element. Helium or other inert gas atmosphere is present in a dry box or remote assembling installation during assembling and sealing, and ordinary welding and brazing techniques are employed in sealing the plugs 13 and 14 to the ends of the tubes 11 and 12.

Having described a preferred embodiment of the present invention, it is to be understood that although specific terms and examples are employed, they are used in a generic and descriptive sense and not for purposes of limitation; the scope of the invention being set forth in the following claims.

What is claimed is:

1. In a fuel element for nuclear reactors, concentric inner and outer tubes, plugs secured to opposite ends of said tubes to define therewith an annular chamber having cylindrical walls, pairs of cooperating inner and outer annular assemblies of fissionable fuel pellets axially seriated within said chamber, the pellets being in the form of segments of a tube, the radially innermost surface of each inner assembly being cylindrical with a radius corresponding to that of the outer surface of said inner tube, the radially outermost surface of each outer assembly being cylindrical and corresponding to that of the inner surface of said outer tube, the inner and outer assemblies of each said pair having tapered interface surfaces matching and engaging each other, and resilient means within said chamber for lurging the inner and outer assemblies of each pair axially together.

2. In a fuel element for nuclear reactors, concentric inner and outer tubes, plugs secured to opposite ends of said tubes to define therewith an annular chamber, outer annular assemblies of fissionable fuel pellets axially seriated within said chamber, each outer assembly having a flared inner surface in radially spaced relationship to said inner tube and a cylindrical outer surface matching and engaging the cylindrical inner surface of said outer tube, inner annular assemblies of fissionable fuel pellets axially seriated within said chamber and surrounded respectively by said outer pellet assemblies so that one inner and its surrounding outer assembly comprise a cooperating pair, each inner assembly having a tapered outer surface matching and engaging said flared inner surface of its surrounding outer pellet assembly and a cylindrical inner surface matching and engaging the cylindrical outer surface of said inner tube, the pellets being in the form of segments of a tube, and resilient means within said chamber for urging one of the pellet assemblies of each said pair axially toward the other and for urging adjacent pairs together.

3. In a fuel element for nuclear reactors, concentric inner and outer tubes, plugs secured to opposite ends of said tubes to define therewith an annular chamber, outer annular assemblies of fissionable fuel pellets axially seriated within said chamber and each having a flared inner surface in radially spaced relationship to said inner tube and a cylindrical outer surface matching and engaging the cylindrical inner surface of said outer tube, inner annular assemblies of fissionable fuel pellets axially seriated within said chamber and each surrounded respectively by an outer pellet assembly, each of said inner pellet assemblies having a tapered outer surface matching and engaging said flared inner surface of its surrounding outer pellet assembly, and a cylindrical inner surface matching and engaging the cylindrical outer surface of said inner tube, one end of each outer annular fuel assembly abutting one end of an axially adjacent inner annular fuel assembly, and resilient means within said chamber for urging each inner assembly axially toward its surrounding outer assembly, said fuel pellets being in the form of segments of a tube comprising enriched compacted and sintered $UO_2$.

References Cited in the file of this patent

UNITED STATES PATENTS

| | | |
|---|---|---|
| 1,971,433 | Tartrais | Aug. 28, 1934 |
| 2,180,883 | Scott | Nov. 21, 1939 |
| 2,414,931 | Colwell et al. | Jan. 28, 1947 |
| 2,838,452 | West et al. | June 10, 1958 |

OTHER REFERENCES

GER–1301, March 1957, General Electric Co. publication, Report on Dresden Nuclear Power Station, presented at ASME Meeting, N.Y.C., Nov. 26, 1956. Copy available from General Electric Co. Offices.

Second U.S. International Conference on the Peaceful Uses of Atomic Energy, article by Simpson and Rickover, Aug. 22, 1958. A/Conf. 15/P/2462.